May 26, 1964
S. LOOSLI
3,134,480
MATERIAL CONVEYOR
Filed April 13, 1962
3 Sheets-Sheet 1
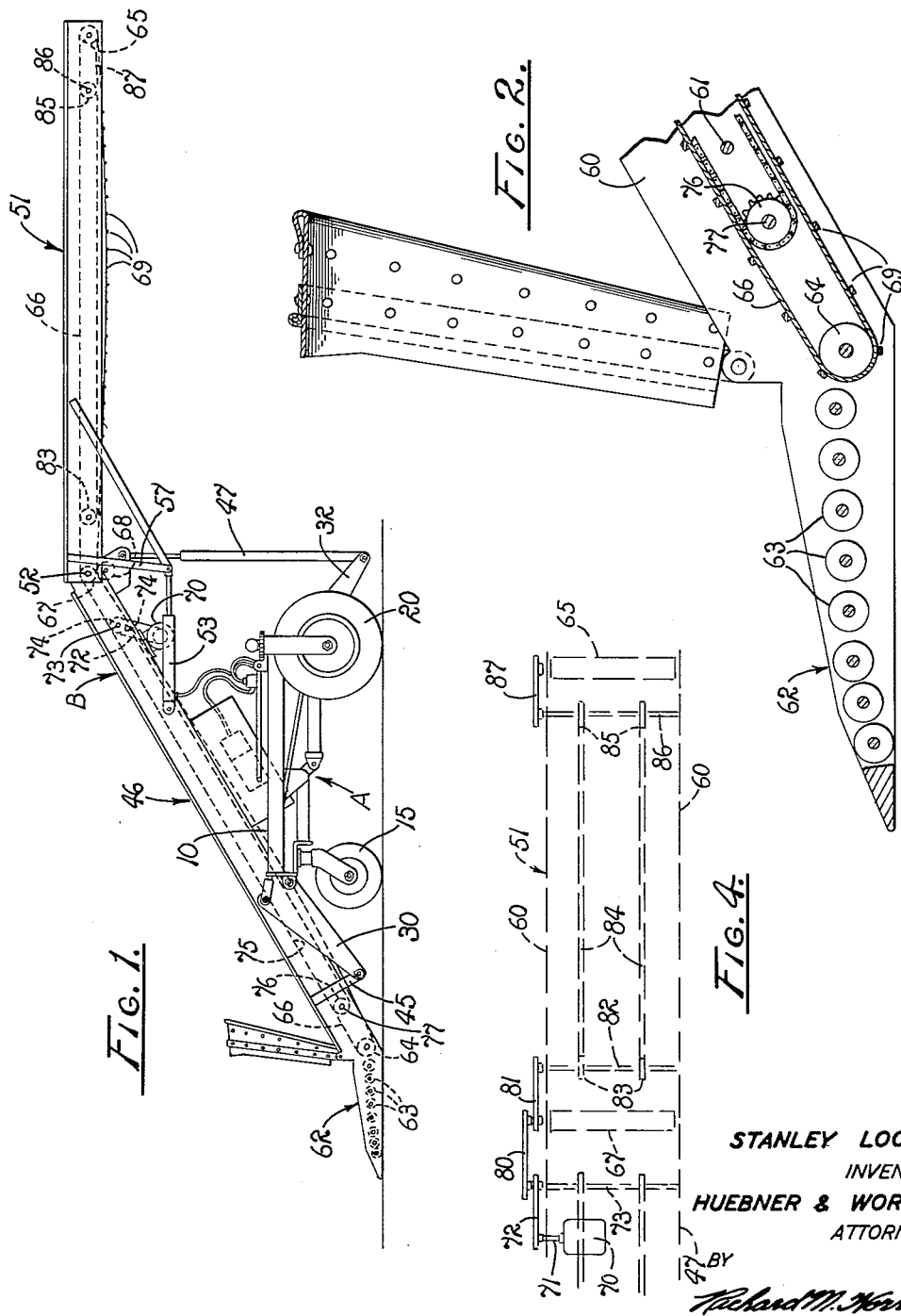
STANLEY LOOSLI
INVENTOR
HUEBNER & WORREL
ATTORNEYS
BY
Richard M. Worrel

STANLEY LOOSLI
INVENTOR
HUEBNER & WORREL
ATTORNEYS

United States Patent Office 3,134,480
Patented May 26, 1964

3,134,480
MATERIAL CONVEYOR
Stanley Loosli, Rte. 1, Box 1, Ashton, Idaho
Filed Apr. 13, 1962, Ser. No. 187,300
11 Claims. (Cl. 198—117)

The present invention relates to an improved material conveyor adapted to utilize a continuous belt and more particularly to such a belt conveyor having upper and lower runs and a synchronously driven endless support mechanism interposed its runs whereby the belt is capable of high loading with minimum diameter drive rollers. This application is a continuation-in-part of my co-pending application Serial Number 106,792 entitled Mobile Conveying Apparatus for Piling or Stacking Commodities, filed May 1, 1961 now Patent No. 3,067,858.

In the past, endless chain-type conveyors have frequently been employed for elevating and transporting loose materials because of their ability to carry heavy loads. Additionally, they are readily adapted to be driven by return end sprockets of a wide range of sizes. With the smaller size sprockets, the conveyors can provide acute return about their ends which enables the material receiving portions thereof to be positioned closely adjacent to a surface on which material to be loaded is supported. However, certain commodities handled by the chain-type conveyors are easily damaged by engagement with the chains. Such commodities include edible produce, such as potatoes, beets, onions, lettuce, tomatoes, pineapples, apples and the like. Handling these commodities with chain conveyors produces excessive damage, impaired quality, and voluminous culls.

It has long been desirable to employ belt-type conveyors in apparatus for handling such produce to provide smooth, somewhat resilient, or cushioned, transporting surfaces which minimize the damage caused by conventional chain-type conveyors. However, belt-type conveyors have not been feasible in many operational environments because of the large turning radii required, if large loads are to be borne. Such radii preclude the positioning of the upper runs of such conveyors sufficiently closely adjacent to support surfaces on which commodities are supported to make scooping or automatic pick-up practical. If the belt is provided with a sufficient number of plies to support a heavy load, its flexibility is impaired to an extent precluding acute return travel. For example, it is generally considered that for every ply a belt is increased, the diameters of the return end support rollers must be increased approximately three inches to achieve the necessary frictional drive. Thus, design considerations for pick-up conveyors intended for automatic or scoop loading have heretofore been confronted with a serious dilemma. If rollers of a minimum diameter were utilized in order that the upper material receiving portions of the conveyors could be positioned in close proximity to a support surface on which the material to be transported was disposed, the maximum load bearing capabilities have been excessively restricted. If the plies of the belts were increased to carry the heavier loads, the diameters of the support rollers have had to be correspondingly increased precluding the desired positioning of the upper runs close to such support surfaces. Further, small rollers have heretofore been incapable of providing sufficient frictional engagement with such conveyor belts to transport heavy loads. For these reasons, it has previously been accepted that pick-up conveyors must either utilize transporting chains, in which event excessive damage to delicate materials occurs, or employ transporting belts and be severely restricted in their load bearing capacities.

It is therefore an object of the present invention to provide an improved belt type conveyor in which acute return travel of the opposite runs thereof is made possible.

Another object is to provide a material handling conveyor which combines the gentle handling attributes of a belt conveyor with the load carrying capacity of a chain conveyor.

Another object is to provide an improved conveyor which makes possible the utilization of a continuous belt as a material transporting member in pick-up conveyors and the like intended for operational environments requiring minimum spacing of upper and lower runs thereof.

Another object is to provide an improved conveyor which gains the advantage of belt operation with minimum diameter conveyor mounting rollers.

Another object is to provide such a conveyor having a material receiving upper run which may be positioned closely adjacent to a material support surface from which such material is to be elevated.

Another object is to provide a belt conveyor which can be frictionally retained comparatively loosely about its transporting drive rollers and yet be dependably motivated even when heavily loaded.

Another object is to provide a belt conveyor which minimizes sagging intermediate the return ends of the belt without requiring excessive tensioning of the belt.

Another object is to obviate the previous requirement for belt conveyors that mounting roller diameters therefor be a function of the ply of such belts.

Other objects and advantages of the present invention will become more fully apparent in the following description in the specification wherein elements which remain substantially unchanged and common to both this and the parent application are provided with identical reference numerals.

In the drawings:

FIG. 1 is a side elevation of the material conveyor of the present invention shown elevationally supported on a mobile chassis.

FIG. 2 is a somewhat enlarged fragmentary vertical section taken centrally of the material receiving portion of the conveyor of FIG. 1.

FIG. 4 is a diagrammatic view of a chain and belt drive system of the present invention.

Figure 3:
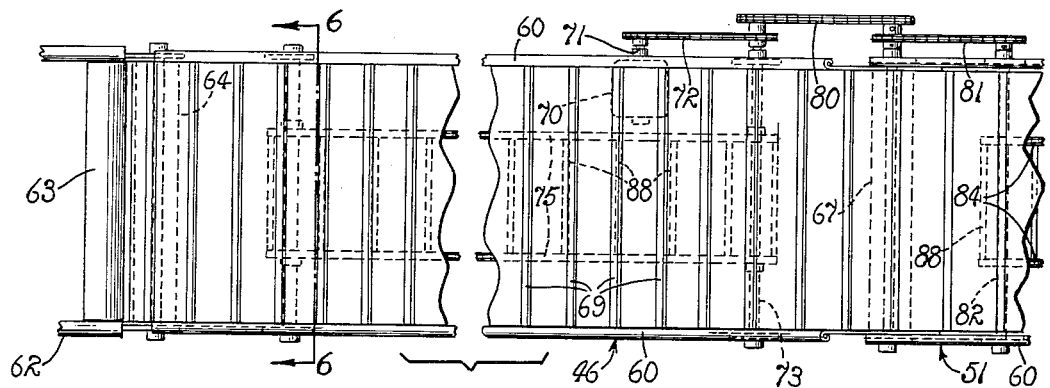
FIG. 3 is a somewhat enlarged fragmentary top plan view of the material conveyor of FIG. 1.

With particular reference to FIG. 1 of the drawings, a mobile chassis A is shown supporting the structure of the present invention providing a conveyor unit B, both of which were shown in my aforementioned co-pending application, Serial Number 106,792. The chassis unit A is the subject of a separate co-pending application being concurrently filed herewith. Briefly, the mobile chassis includes a frame 10 supported by a caster wheel 15 and by a pair of steerable drive wheels 20. The chassis mounts pairs of forward and rearward support arms 30 and 32, respectively, pivotally to support a U-shaped mounting strap 45 and a pair of substantially upright adjustable standards 47 at their respective outer ends thereof so as to support the conveyor unit B in elevationally adjustable position with respect to the chassis. This feature is more completely described and covered by the aforementioned parent application.

The conveyor unit B embodying the principles of the present invention provides an inclined receiving leg portion 46 and substantially horizontally disposed discharge leg 51. The discharge leg portion 51 is pivotally connected, as at 52, to the rearward end of the receiving leg portion 46. Angular relative adjustment between the receiving and discharge legs is provided by a pair of hydraulic rams one of which is indicated at 53 providing extensible links between the receiving leg portion 46 and a bracket structure 57 rigidly mounted in depending relation from the discharge leg portion 51. The rams 53 may be of the single acting type which need only raise the leg since its own weight will effect lowering thereof when fluid pressure in the ram is relieved.

The conveyor unit B further includes a pair of side frame members 60 which are maintained in transversely spaced relation by a plurality of longitudinally spaced cross rods 61. At the lower receiving end of the leg portion 46 there is provided a scoop loading member 62 having a plurality of driven rollers 63 for receiving the commodity to be handled and to convey it to the inclined receiving leg 46 of the conveyor. The hopper or scoop member 62 is discussed only briefly herein, since it comprises the subject matter of a further co-pending application.

An elongated cylindrical roller 64 is rotatably mounted between the side frame members 60 closely adjacent to the rearward portion of the hopper 62. A similar cylindrical roller 65 is mounted in substantially parallel relation to the roller 64 at the outer end of the discharge leg 51 of the conveyor. An endless substantially flat conveyor belt 66 of rubber, rubberized fabric or other similar belt material, is trained about the rollers 64 and 65 for circuitous movement therebetween. A cylindrical intermediate bend roller 67 is disposed in substantially parallel relation to the rollers 64 and 65 coaxial with the hinge connection 52 between the receiving and discharge legs 46 and 51 which is engageable by the upper run of the belt. An idler roller 68 is also rotatably mounted between the frame members 60 in downwardly spaced relation from the bend roller 67 to engage the lower or return run of the belt adjacent to the region of articulation of the receiving and discharge legs of the conveyor. The belt 66 is preferably provided with a plurality of transversely disposed equally, longitudinally spaced, cleats or ribs 69 to minimize slippage between the belt and commodities placed thereon, particularly during travel along the inclined leg 46.

Figure 5:
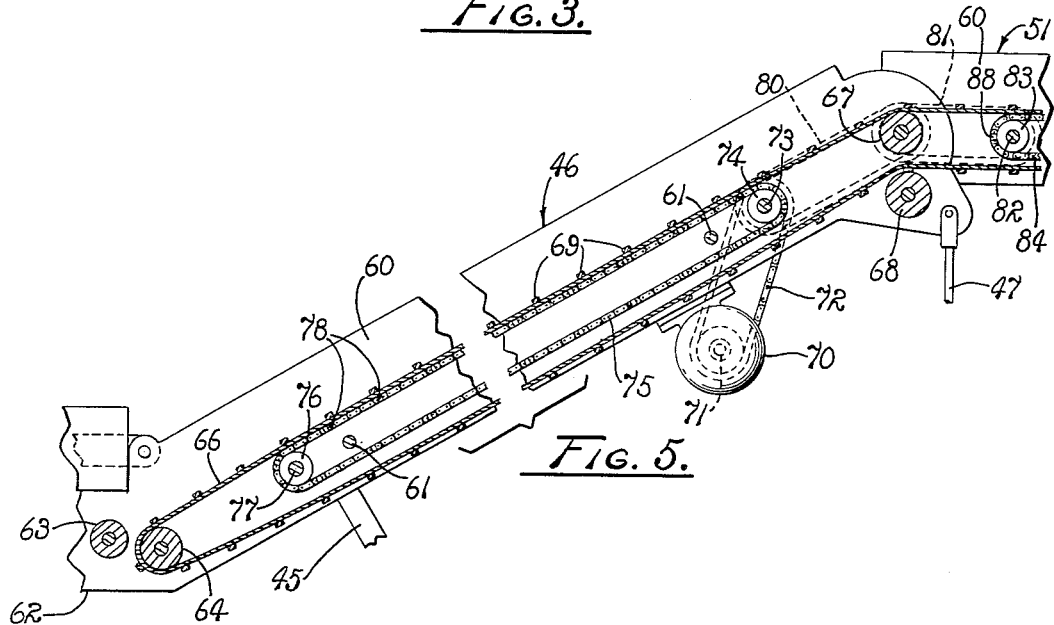
FIG. 5 is a fragmentary somewhat enlarged vertical section taken centrally of the inclined portion of the material conveyor of FIG. 1.

The conveyor belt 66 is driven in a continuous path of movement about the rollers 64 and 65 by a motor 70 which may either be of the electrically energized or of the hydraulically actuated type. As best shown in FIGS. 3 and 5, the motor includes a drive shaft 71 which is connected by a chain and sprocket drive indicated at 72 to a cross shaft 73 disposed intermediate the upper and lower runs of the belt and adjacent to the bend roller 67. The cross shaft 73 mounts a pair of spaced sprockets 74 about which are trained a pair of endless sprocket chains 75. The endless chains 75 each include upper and lower runs which extend in substantially parallel relation to each other to be trained about a pair of spaced sprockets 76 mounted on a cross shaft 77 disposed adjacent to the lower or material receiving end of the inclined conveyor leg 46. A plurality of longitudinally equally spaced flight bars 78 are transversely disposed between the chains 75 frictionally to engage the upper run of the belt in supporting driving relation thereto.

The upper cross shaft 73 of the leg 46 extends outwardly of the side frame member 60 to mount a chain and sprocket drive 80 for driving the bend roller 67. It is noted that the sprockets in the sprocket drive 80 have a pitch diameter identical to the diameter of the rollers 67 so that the linear velocities of the chain 75 and belt 66 are identical. The roller 67, by way of a chain and sprocket drive 81, in turn drives a cross shaft 82 mounted between the side member 60 of the discharge leg 51. The shaft 82 carries a pair of transversely spaced sprockets 83 about which are trained a pair of corresponding endless chains 84. The chains 84 extend longitudinally of the discharge leg 51 and are trained about a pair of correspondingly spaced sprockets 85 carried on a cross shaft 86 adjacent to the extended or discharge end of the leg 51. The cross shaft 86 in turn drives the outer belt roller 65 through a similar chain and sprocket drive 87. A plurality of flight bars 88 are transversely extended in equally longitudinally spaced interconnecting relation between the chains 84 frictionally to engage and support the upper run of the belt 66 within the discharge leg portion 51 of the conveyor. It is readily apparent that the upper run of the belt 66 is supported and its drive augmented by the supporting chains 75 and 84 throughout substantially its entire length between the rollers 64 and 65. Such support and drive of the belt appreciably reduces tension and wear thereon as would be experienced in conventional belt drives driven solely by their support rollers.

Figure 6:
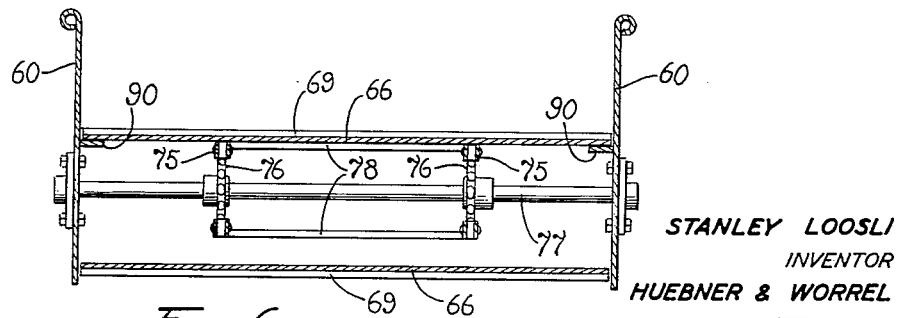
FIG. 6 is a transverse substantially vertical section taken through the conveyor on line 6—6 of FIG. 3.

As best shown in FIG. 6, a pair of opposite side flange members 90 having rigid connection to the side plates 60 are preferably disposed in supporting relation to the edges of the belt. It is noted that the flanges are optionally provided as determined by the weight of the material to be handled. It is also noted that the axis of rotation of the bend roller 67 is disposed substantially concentrically to the axis of articulation between the receiving and discharge leg portions 46 and 51 about the pivot 52. With this arrangement, a substantially uniform tension is maintained upon the upper run of the belt in all of its angular positions during relative movement between the receiving and discharge legs of the conveyor.

Figure 7:
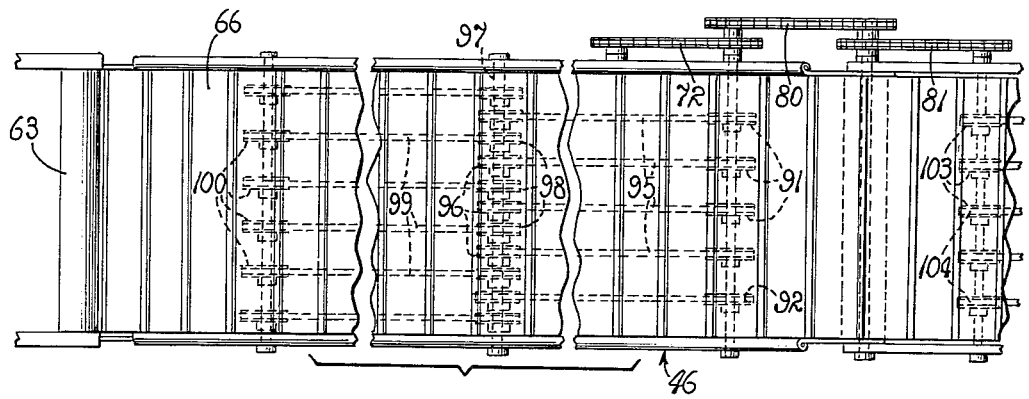
FIG. 7 is a fragmentary top plan view of the material conveyor showing a second form of the conveyor belt support mechanism.
Figure 8:
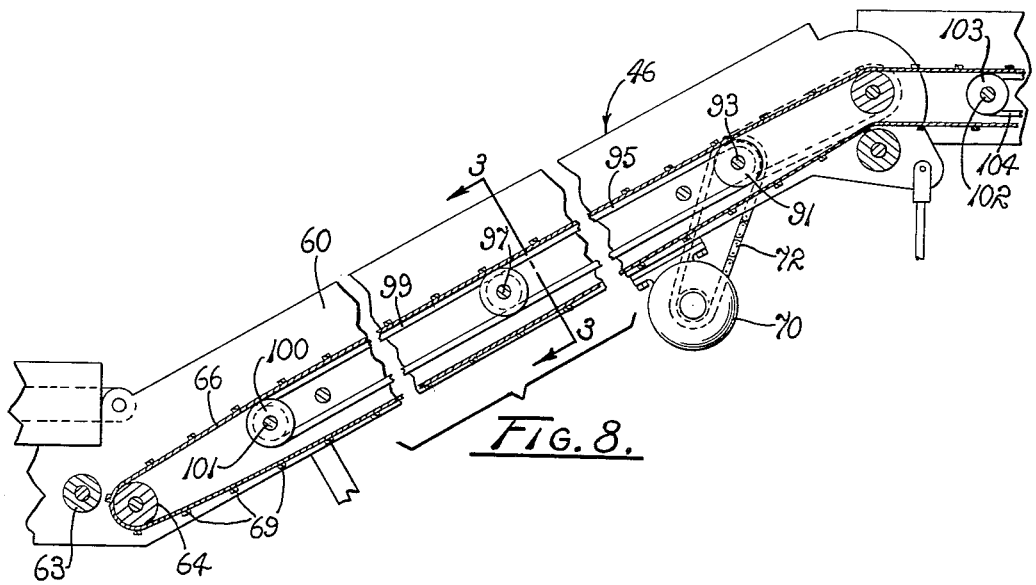
FIG. 8 is a fragmentary longitudinal vertical section taken centrally of the conveyor and belt support mechanism of FIG. 8.
Figure 9:
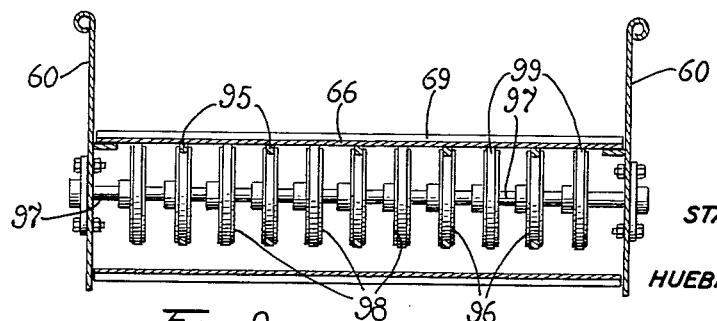
FIG. 9 is a transverse substantially vertical section through the conveyor and support mechanism of the second form, taken on line 9—9 of FIG. 8.

A second form of the synchronously driven endless support mechanism for the conveyor belt 66 is shown in FIGURES 7, 8, and 9. In the second form, a plurality of circular sheaves 91 having V-shaped peripheral grooves 92 are rigidly mounted on a rotary cross shaft 93 disposed in the leg 46 of the conveyor B intermediate the upper and lower runs of the conveyor belt 66 and adjacent to the bend roller 67 in place of the cross shaft 73 of the first form. The sheaves are transversely positioned on the cross shaft 93 in substantially equally spaced relation intermediate the side frame members 60. Each of the sheaves mounts an elongated continuous V-belt 95 about its grooved periphery which includes upper and lower runs extended in substantially parallel relation to each other to be individually trained about a plurality of longitudinally aligned peripherally grooved circular sheaves 96 rigidly mounted on a cross shaft 97 disposed intermediate the ends of the inclined conveyor leg 46.

An additional set of peripherally grooved sheaves 98 is rigidly mounted on the cross shaft 97 in transversely equally spaced relation between the spaced sheaves 96 thereon. A plurality of endless V-belts 99 are trained about the peripheries of the sheaves 96 and include upper and lower runs extended in substantially parallel relation to each other which are individually trained about a plurality of longitudinally aligned peripherally grooved sheaves 100 rigidly mounted on a cross shaft 101 disposed adjacent to the lower or material receiving end of the inclined conveyor leg 46 in place of the cross shaft 77 of the first form. The upper runs of the V-belts 95 and 99 are thereby disposed frictionally to engage the upper run of the conveyor belt 66 in supporting driving relation thereto.

The cross shaft 93 is adapted to be driven by the chain and sprocket drive 72 from the motor shaft 71 employed in the first form. A cross shaft 102 replaces the cross shaft 82 of the first form to mount a plurality of peripherally grooved sheaves 103 closely adjacent to the forward sets of circular sheaves having V-shaped peripheral grooves mounted in spaced substantially parallel relation in the frame between the rollers, V-belts mounted in circumscribing relation about the grooved peripheries of the sheaves providing upper runs extended therebetween in supporting relation to the upper run of the flat belt, and driving means connected to a roller and to a set of said sheaves rotating the same at substantially identical peripheral velocities whereby the flexible belt and the V-belts are traveled at substantially identical linear velocities.

4. A material conveyor comprising a frame having interconnected material receiving and discharge legs, a pair of rollers rotatably individually mounted in spaced substantially parallel relation in said legs of the frame, intermediate rollers disposed in the frame between said pair of spaced rollers, and a continuous belt mounted in circumscribing relation on the pair of rollers and providing upper and lower runs tensioned therebetween upon said intermediate rollers, a pair of sprocket members mounted in spaced substantially parallel relation in each of said receiving and discharge legs of the frame between the intermediate rollers and each of said pair of rollers, support chains having a plurality of flight bars thereon mounted in circumscribing relation on the sprocket members providing upper runs tensioned therebetween in supporting relation to the upper run of the belt, and driving means connected to a roller and a sprocket member rotating the same at substantially identical peripheral velocities whereby the belt and the chains are traveled at substantially identical linear velocities.

5. A material conveyor comprising a frame having interconnected material receiving and discharge legs, pairs of rollers rotatably individually mounted in spaced substantially parallel relation in each of said legs of the frame, intermediate rollers disposed in the frame between said pairs of spaced rollers, and a continuous substantially flat belt mounted in circumscribing relation on the pairs of rollers and providing upper and lower runs tensioned therebetween upon said intermediate rollers, a plurality of sets of circular sheaves having V-shaped peripheral grooves mounted in spaced substantially parallel relation in each of said receiving and discharge legs of the frame between the intermediate rollers and each of said pairs of rollers, a plurality of elongated continuous V-belts mounted in circumscribing relation about the grooved peripheries of the sheaves providing upper runs tensioned therebetween in supporting relation to the upper run of the flat belt, and driving means connected to a roller and to a set of said sheaves rotating the same at substantially identical peripheral velocities whereby the flat belt and the V-belts are traveled at substantially identical linear velocities.

6. A material conveyor comprising a frame having pivotally interconnected material receiving and discharge legs, powered means connected to the legs to swing the legs relative to each other, a pair of rollers rotatably individually mounted in spaced substantially parallel relation in said legs of the frame, intermediate rollers disposed in the frame between said pair of rollers, a continuous belt of resiliently flexible material mounted in circumscribing relation about said pair of rollers and providing upper and lower runs tensioned therebetween individually supported on said intermediate rollers, two sets of pairs of sprocket members individually mounted in spaced substantially parallel relation in said legs of the frame between the intermediate rollers and their respective rollers in the legs, a support chain having a plurality of substantially equally longitudinally spaced flight bars mounted in circumscribing relation about each set of sprockets providing an upper run tensioned therebetween with the flight bars disposed in supporting frictionally contacting relation with the upper run of the belt, and a motor mounted on the frame having driving connection to said rollers and sprockets rotating the same at substantially identical peripheral velocities whereby the belt and the support chains are traveled at substantially identical linear velocities.

7. A material conveyor comprising an elongated frame having angularly related material receiving and discharge legs, said legs having adjacent ends pivoted to each other and oppositely extended ends, powered means interposed said legs to swing the legs relative to each other, a pair of rollers rotatably mounted individually adjacent to each of said outer ends of the legs in substantially parallel relation to each other, an intermediate roller rotatably mounted in the frame substantially concentrically of the pivotal interconnection of the ends of the legs in substantially parallel relation to said rollers in the outer ends of the legs, a continuous belt of resiliently flexible material mounted in circumscribing relation about said rollers in the outer ends of the legs and providing an upper run tensioned therebetween supported on said intermediate roller, a pair of sprocket members mounted in spaced substantially parallel relation in said receiving leg of the frame between the intermediate roller and the outer end roller, a chain having a plurality of substantially equally longitudinally spaced transversely extended flight bars mounted in circumscribing relation on the sprocket members providing an upper run tensioned therebetween in supporting relation to the upper run of the belt in the receiving leg of the frame, a pair of sprocket members mounted in spaced substantially parallel relation in said discharge leg of the frame between the intermediate roller and the outer end roller, a chain having a plurality of substantially equally longitudinally spaced transversely extended flight bars mounted in circumscribing relation on the sprocket members providing an upper run tensioned therebetween in supporting relation to the upper run of the belt in the discharge leg of the frame, and a motor mounted on the frame having driving connection to said rollers and sprockets rotating the same at substantially identical peripheral velocities whereby the belt and the support chains are traveled at substantially identical linear velocities.

8. A material conveyor comprising an elongated frame having angularly related material receiving and discharge legs, said legs having adjacent ends pivoted to each other and oppositely extended ends, powered means connected to the legs to swing the legs relative to each other, a pair of substantially cylindrical rollers rotatably mounted individually adjacent to each of said outer ends of the legs in substantially parallel relation to each other, an intermediate substantially cylindrical roller rotatably mounted in the frame substantially concentrically of the pivotal interconnection of the ends of the legs in substantially parallel relation to said rollers in the outer ends of the legs, a continuous susbtantially flat belt of resiliently flexible material mounted in circumscribing relation about said rollers in the outer ends of the legs and providing an upper run tensioned therebetween supported on said intermediate roller, a plurality of sets of circular sheaves having V-shaped peripheral grooves mounted in spaced substantially parallel relation in said receiving leg of the frame between the intermediate roller and the outer end roller, a plurality of continuous V-belts equally transversely spaced in the frame in circumscribing relation about the grooved peripheries of the sheaves providing upper runs tensioned therebetween in supporting relation to the upper run of the flat belt in the receiving leg of the frame, a plurality of sets of circular sheaves having V-shaped peripheral grooves mounted in spaced substantially parallel relation in said discharge leg of the frame between the intermediate roller and the outer end roller, a plurality of transversely equally spaced continuous V-belts in the frame mounted in circumscribing relation about the grooved peripheries of the sheaves providing upper runs tensioned therebetween in supporting relation with the upper run of the flat belt in the discharge leg of the frame, and a motor mounted on the frame having driving articulated end of the discharge leg 51 of the conveyor B. The sheaves 103 individually mount a plurality of longitudinally extended V-belts, fragmentarily indicated at 104, which provide a conveyor belt drive and support mechanism for the discharge leg 51 identical to the V-belt drive and support mechanism described for the inclined leg 46.

As in the sprockets 74—76 and 83—85 of the first form, the sheaves 91, 96, 98 and 103 are of a pitch diameter identical to the diameter of the rollers 64, 65 and 67 so that the linear velocities of the V-belts 95, 99 and 104 and the conveyor belt 66 are identical. It is readily apparent that the V-belts of the second form support and drive the upper run of the conveyor belt 66 throughout substantially its entire length between the rollers 64 and 65. The V-belts are preferred in some installations where a quieter drive is desired without the usual maintenance problems attendant to chain drives and provide the dependable support desired.

Operation

The operation of the described embodiments of the subject invention is believed to be clearly apparent and is briefly summarized at this point. To load potatoes or other bulk material, not shown, the chassis A is driven so as to slide the scoop loading member 62 into a pile thereof. The rollers 63 are rotated to deliver the material to the receiving leg 46 of the conveyor. The motor 70 is energized to drive the belt 66 between the rollers 64 and 65 by way of the support chains 75 and 84 and their respective chain sprocket drives 80, 81 and 87 therebetween. As best shown in FIG. 5, the chains and belt are driven in a clockwise direction so that the upper run thereof is motivated from left to right. With this arrangement, the upper run is always tensioned successively rearwardly during its travel from the forward roller 64 to the roller 65.

The tensioning of the upper run of the conveyor belt 66 is further enhanced by the supporting drive mechanism providing the support chains 75 and 84 of the first form and the V-belts 95, 99 and 104 of the second form which are disposed in frictional supporting engagement with the conveyor belt. The drive sprockets 74—76 and 83—85 of the first form have pitch diameters identical to the diameter of the belt support rollers 64, 65 and 67 to preclude relative movement between the conveyor belt and the support drive chains. Similarly, the sheaves 91, 96, 98 and 103 of the second form are also of a pitch diameter identical to the diameter of the belt support rollers 64, 65 and 67 to preclude relative movement between the conveyor belt and the support drive V-belts. With the chains 75 and 84 trained about their respective sprockets, the combined diametrical dimension thereof is such that the chain disposes the upper run of the belt outwardly of a line tangentially extended between the rollers 64 and 67 whereby the portions of the belt between the sprockets and the rollers declines somewhat from the sprockets to the rollers to increase the tension of the entire upper run of the belt. The upper run of the belt is similarly tensioned in the second form of the present invention by the combined diametrical dimension of the V-belts and their respective supporting sheaves.

With movement of the scoop member 62 into a pile of material to be handled, the material is thereby conveyed to the lower receiving end of the belt 66. The material is transmitted upwardly rearwardly upon the belt within the inclined receiving leg 46 in a continuous path of travel to the discharge leg 51 of the conveyor for ejection thereby into any suitable receiving receptacle, not shown.

It is readily apparent that during the above described movement, the material upon the belt 66 is supported substantially along the entire length thereof by the support chains 75 and 84 and their respective flight bars 78 and 88 disposed therebetween. In the second form, the plurality of transversely spaced V-belts 95, 99 and 104 support the upper run of the conveyor belt 66 substantially along the entire length thereof and substantially across the entire transverse width between the side frame members 60. With this arrangement, support rollers 64, 65 and 67 of minimum diameter can be employed along with a minimum ply belt which combine with the synchronous support mechanism adequately to support the load. Additionally, the relatively small diameter roller 64 is positioned closely adjacent to the surface on which the material or commodities are supported thereby to receive such material from the scoop member 62 with a minimum of elevation required therebetween.

In contrast with conventional requirements for thick multiple-ply belts and large drive rollers to provide adequate frictional contact to transport heavy loads, the present invention makes possible the ultilization of much thinner belts supported by the chains of the first form and the V-belts of the second form and adequate motivation even under conditions of heavy loading and with acute return travel about small diameter rollers. The frictional engagement between the belt support mechanisms and the conveyor belts provides more positive drive than normally attainable between such belts and even relatively large diameter drive rollers.

Although the invention has been herein shown and described in what is conceived to be the most practical and preferred embodiments, it is recognized that departures may be made therefrom within the scope of the invention, which is not to be limited to the deails disclosed herein but is to be accorded the full scope of the claims so as to embrace any and all equivalent devices and apparatus.

Having described my invention, what I claim as new and desire to secure by Letters Patent is:

1. A material conveyor comprising a frame, an endless flexible member, a pair of rollers mounted in spaced substantially parallel relation in the frame supporting said flexible member for circuitous travel thereabout whereby the flexible member provides upper and lower runs tensioned between the rollers, a continuous elongated auxiliary support member, auxiliary rotatable means mounted in spaced substantially parallel relation in the frame between the upper and lower runs of the flexible member and intermediate the rollers therefor and having the auxiliary support member tensioned thereabout and providing an upper run in supporting engagement with the upper run of the endless flexible member, and powered means having driving connection with the rollers and with said auxiliary rotatable means traveling the flexible member and the auxiliary support member at substantially the same linear velocity.

2. A material conveyor comprising a frame, a pair of rollers rotatably mounted in spaced substantially parallel relation in the frame, an endless flexible belt mounted in circumscribing relation on the rollers and providing upper and lower runs tensioned therebetween, a pair of rotatable members mounted in spaced substantially axially parallel relation in the frame between the rollers and individually adjacent thereto, an endless flexible member having transverse support elements thereon mounted in circumscribing relation on the rotatable members providing an upper run tensioned therebetween in supporting relation to the upper run of the belt, and driving means connected to a roller and a rotatable member rotating the same at substantially identical peripheral velocities whereby the belt and the flexible member are traveled at substantially identical linear velocities with the support elements along the upper run of the flexible member in supporting relation to the upper run of the belt.

3. A material conveyor comprising a frame, a pair of rollers rotatably mounted in spaced substantially parallel relation in the frame, an endless flexible belt mounted in circumscribing relation to the rollers and providing upper and lower runs tensioned therebetween, connection to said rollers and sheaves rotating the same at a substantially identical peripheral velocity whereby the flat belt and the V-belts are traveled at substantially identical linear velocities.

9. An auxiliary support for an elongated conveyor including a frame, an endless belt, spaced rollers mounted in the frame about which the belt is trained to provide an upper load transporting run, and drive means for one of the rollers, comprising a pair of rotatable members mounted in the frame in spaced substantially parallel relation beneath the upper run of the belt and between the rollers, an endless flexible member trained about the rotatable members having an upper run below the upper run of the belt and adjacent thereto, and flight bars mounted transversely on the flexible member in supporting relation to the upper run of the belt along the upper run of the flexible member.

10. An auxiliary drive and support, for an elongated conveyor including a frame, an endless belt, spaced rollers mounted in the frame about which the belt is trained to provide an upper load transporting run, and drive means for one of the rollers, in which the diameter of said one of the rollers is restricted by environmental requirements to such an extent that its peripheral engagement with the belt is less than desired for drive purposes, comprising a pair of rotatable members mounted in the frame in spaced substantially parallel relation beneath the upper run of the belt and between the rollers, an endless flexible member trained about the rotatable members having an upper run below the upper run of the belt and adjacent thereto, flight bars mounted transversely on the flexible member in supporting relation to the upper run of the belt along the upper run of the flexible member, and a drive linkage interconnecting the drive means and a rotatable member rotating said member at substantially the same peripheral velocity as said one roller.

11. The auxiliary drive and support of claim 10 in which the flexible member includes a pair of endless substantially parallel chains, the rotatable members are sprockets having the chains meshed therewith and the flight bars interconnect the chains in substantially parallel relation to the axes of the rotatable members.

References Cited in the file of this patent

UNITED STATES PATENTS

| | | |
|---|---|---|
| 406,788 | Sprague | July 9, 1889 |
| 1,726,555 | Gammeter | Sept. 3, 1929 |